United States Patent
Dent (10) Patent No.: US 7,209,511 B2
(45) Date of Patent: Apr. 24, 2007

(54) INTERFERENCE CANCELLATION IN A CDMA RECEIVING SYSTEM

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 961 days.

(21) Appl. No.: 09/945,002

(22) Filed: Aug. 31, 2001

(65) Prior Publication Data

US 2003/0053524 A1  Mar. 20, 2003

(51) Int. Cl.
 H04B 1/707 (2006.01)
(52) U.S. Cl. .................................................... 375/148
(58) Field of Classification Search ................ 375/130, 375/140, 147–148, 316, 346–349
 See application file for complete search history.

(56) References Cited

U.S. PATENT DOCUMENTS

| | | | |
|---|---|---|---|
| 4,995,057 A | 2/1991 | Chung | |
| 5,237,612 A | 8/1993 | Raith | |
| 5,481,572 A | 1/1996 | Skold et al. | |
| 5,499,272 A | 3/1996 | Bottomley | |
| 5,509,052 A | 4/1996 | Chia et al. | |
| 5,561,687 A * | 10/1996 | Turner | 375/233 |
| 5,594,941 A | 1/1997 | Dent | |
| 5,619,503 A | 4/1997 | Dent | |
| 5,631,898 A | 5/1997 | Dent | |
| 5,642,358 A | 6/1997 | Dent | |
| 5,724,666 A | 3/1998 | Dent | |
| 5,812,935 A | 9/1998 | Kay | |
| 5,812,947 A | 9/1998 | Dent | |
| 5,822,380 A * | 10/1998 | Bottomley | 375/347 |
| 5,845,199 A | 12/1998 | Longshore | |
| 5,848,060 A | 12/1998 | Dent | |
| 5,867,791 A | 2/1999 | Chambert | |
| 5,883,888 A | 3/1999 | St-Pierre | |
| 5,887,027 A | 3/1999 | Cohen et al. | |

(Continued)

FOREIGN PATENT DOCUMENTS

EP            0936781         8/1999

(Continued)

OTHER PUBLICATIONS

*Initial Estimation of Communication Efficiency of Indoor Wireless Channels*, G.J. Foschini and R.A. Valenzuela, Wireless Networks 3, pp. 141-154, 1997; Lucent Technologies, Bell Labs Innovations, Crawford Hill Laboratory, Holmdel, NJ 07733, USA.

(Continued)

*Primary Examiner*—Kevin Burd
(74) *Attorney, Agent, or Firm*—Coats & Bennett, PLLC.

(57) ABSTRACT

Transmitted signals from plurality of mobile terminals are received at one or more base stations in a Code Division Multiple Access system. The base stations send the received signals to a central processor in the form of complex signal sample streams. The central processor determines the correlations between the spreading codes used by the mobile terminals and combines the interference correlations with channel estimates to form an interference matrix. The central processor uses the interference matrix to process the received signals reduce the interference between signals from different mobile terminals.

40 Claims, 5 Drawing Sheets

U.S. PATENT DOCUMENTS

| | | | |
|---|---|---|---|
| 5,909,460 | A | 6/1999 | Dent |
| 5,930,248 | A | 7/1999 | Langlet et al. |
| 5,940,741 | A | 8/1999 | Briancon et al. |
| 5,940,742 | A | 8/1999 | Dent |
| 5,963,874 | A | 10/1999 | Mahler |
| 5,991,282 | A | 11/1999 | Langlet et al. |
| 6,006,075 | A | 12/1999 | Smith et al. |
| 6,067,324 | A | 5/2000 | Harrison |
| 6,081,566 | A | 6/2000 | Molnar et al. |
| 6,088,593 | A | 7/2000 | Dent |
| 6,104,933 | A | 8/2000 | Frodigh et al. |
| 6,144,711 | A | 11/2000 | Pollack et al. |
| 6,181,739 | B1 | 1/2001 | Ryde et al. |
| 6,434,366 | B1 | 8/2002 | Harrison et al. |
| 6,473,467 | B1 | 10/2002 | Wallace et al. |
| 6,546,043 | B1 * | 4/2003 | Kong .................. 375/148 |
| 6,590,932 | B1 * | 7/2003 | Hui et al. ............. 375/232 |
| 6,810,073 | B1 * | 10/2004 | Karlsson .............. 375/144 |
| 6,862,314 | B1 * | 3/2005 | Jurgensen et al. ...... 375/142 |
| 2002/0036996 | A1 | 3/2002 | Ozluturk et al. |
| 2002/0067761 | A1 * | 6/2002 | Kong et al. .......... 375/148 |

FOREIGN PATENT DOCUMENTS

| | | |
|---|---|---|
| EP | 1067710 | 1/2001 |
| EP | 1075122 | 2/2001 |
| EP | 1087545 | 3/2001 |
| EP | 1207645 | 5/2002 |
| WO | WO 9809381 | 3/1998 |
| WO | WO 9837671 | 8/1998 |
| WO | WO 9921375 | 4/1999 |
| WO | WO 0135548 | 5/2001 |
| WO | WO 0197474 | 12/2001 |
| WO | WO 0199453 | 12/2001 |

OTHER PUBLICATIONS

*On Limits of Wireless Communications in a Fading Environment When Using Multiple Antennas*, G.J. Foschini and M.J. Gans, Wireless Personal Communications, vol. 6 (No.3), pp. 311-335, Kluwer Academic Publishers, Mar. 1998; Lucent Technologies, Bell Labs Innovations, Crawford Hill Laboratory—R137, 791 Holmdel-Keyport Road, Holmdel, NJ 07733-0400, USA.

Ying-Chang, Liang et al: "Transmit Antenna Array Techniques for Cellular CDMA Systems" Personal, Indoor and Mobile Radio Communications, 1998. The Ninth IEEE International Symposium on Boston, MA, USA, Sep. 8-11, 1998, New York, NY, USA<IEEE, US, Sep. 8, 1998, pp. 1396-1400, XP010314608 ISBN: 0-7803-4872-9.

Kawakami E et al: "Multi-Stage Interference Canceller Systems With Accurate Radio Channel Estimation Under Fading Environment" 1997 IEEE 6th International Conference on Universal Personal Communication Record. San Diego, Oct. 12-16, 1997, IEEE International Conference on Universal Personal Communications, New York, IEEE, US, vol. 2 conf. 6, Oct. 12, 1997, pp. 475-479, XP010248754 ISBN: 0-7803-3777-8.

* cited by examiner

INTERFERENCE CANCELLATION IN A CDMA RECEIVING SYSTEM

BACKGROUND OF THE INVENTION

The present invention relates generally to a CDMA mobile communication system for receiving signals from multiple mobile subscriber terminals and, more particularly, to a method of processing signals received from multiple mobile subscriber terminals to reduce interference between signals from different mobile subscriber terminals.

Code Division Multiple Access (CDMA) is a multiple access technique that allows multiple users to communicate simultaneously over the same frequency. Multiple access is achieved through the use of pseudorandom (PN) sequences called spreading codes that modulate the carrier, spreading the spectrum of the waveform. The sample rate (also called the chip rate) of the spreading codes is chosen so that the bandwidth of the transmitted signal is several times the bandwidth of the original signal. Spreading codes used in a CDMA system may be chosen so that the spreading codes used by different terminals are mutually orthogonal. When viewed in the time domain, the transmitted signals from different mobile terminals may overlap with each other. However, the use of orthogonal spreading codes separates the transmitted signals in code space.

A CDMA receiver separates overlapping signals by means of a correlator that uses the particular PN sequence for a desired signal to despread the received signal. The unwanted signals, whose spreading codes do not match the selected PN sequence, are not despread in bandwidth and, as a result, contribute only to the noise. The output of the correlator is sent to a narrow-bandwidth filter, that further reduces the interference from the unwanted signals.

In a CDMA system, the spreading codes are orthogonal only when the codes are aligned in time. When the spreading codes are shifted in time, there is some cross-correlation between spreading codes. This cross-correlation results in additional interference at the output of the correlator. Therefore, CDMA systems typically employ dynamic time alignment, wherein mobile terminals are commanded by the base station to either advance or retard their timing in order to preserve a desired time relationship between transmitted signals from different mobile terminals. However, the ability to maintain precise time alignment between signals from different mobile terminals is limited by multipath signal propagation, which is a characteristic of land-based mobile communication systems.

Multipath propagation is caused by reflections of the transmitted signals from surrounding objects (e.g., hills, buildings, etc.), giving rise to many delayed rays or echoes of a transmitted signal. While it may be possible to synchronize signals transmitted from two or more mobile terminals such that selected rays or echoes are received at a base station with a desired time relationship, reflected rays or echoes with different time delays will not be time aligned. Therefore, some interference resulting from cross-correlation between spreading codes is inevitable in a mobile communication system.

SUMMARY OF THE INVENTION

The present invention provides a method and apparatus for reducing interference between signals transmitted from different mobile terminals in a CDMA mobile communication system. A plurality of mobile terminals transmit respective spread spectrum coded signals to one or more base stations in a mobile communication network. Rake receivers located within the base stations then despread the signals transmitted from the plurality of mobile terminals. The transmitted signals typically include pilot signals or CDMA pilot codes to enable the rake receivers to generate estimates of the propagation channels from the mobile terminals to the base stations. The received signals output from each of the rake receivers are input to a central processor.

The central processor models the mutual interference between the received signals by combining correlation coefficients between the known spreading codes with the channel estimates produced by the rake receivers to obtain an interference matrix A. The processor uses the interference matrix A to combine the received signals such that the mutual interference between signals from different mobile terminals is substantially eliminated. The received signal from each mobile terminal is then processed to compensate for the effects of intersymbol interference, for example, by means of a Viterbi equalizer.

The invention can be employed with a signal base station having a single receiving antenna, with a single base station having multiple receiving antennas, or with multiple base stations, each having one or more antennas.

DETAILED DESCRIPTION OF THE INVENTION

Figure 1:
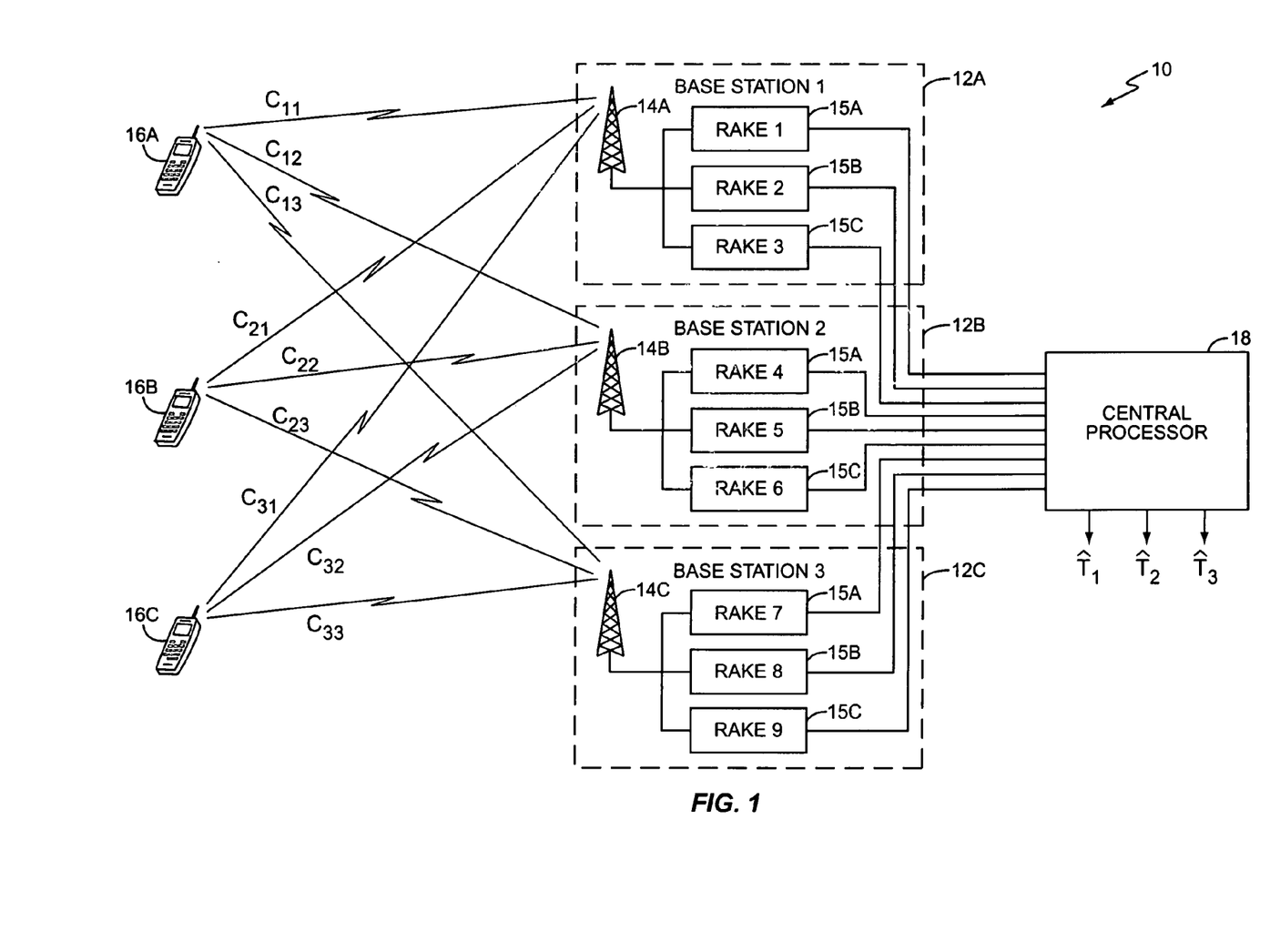
FIG. 1 is a block diagram of a wireless communication network according to the present invention.

Turning now to the drawings, FIG. 1 illustrates an exemplary wireless communication network for practicing the present invention, generally referred to by the numeral 10. A plurality of mobile terminals 16 transmit signals to one or more base stations 12. The base stations 12 receive the transmitted signals via antennas 14. As seen in FIG. 1, each base station 12 receives signals overlapping in time from two or more mobile terminals 16. Base stations 12 forward the received signals to a central processor 18, which as described below, processes the received signals to reduce the mutual interference between the signals from different mobile terminals 16.

For purposes of explaining the present invention, the simple example of three base stations 12 receiving signals from three mobile terminals 16 is used. In this example, each one of the mobile terminals 16 transmits a signal to each base station 12. Each mobile terminal 16 transmits the same signal to all three base stations 12; however, the signals transmitted by different mobile terminals 16 are different. The transmitted signals combine at each base station 12; but, because the transmit signals are modulated with different spreading codes, each base station 12 is able to separate the signals received from different mobile terminals 16. To separate the signal received from a given mobile terminal 16 from signals received from other mobile terminals 16, the base station 12 correlates the combined signal from all three mobile terminals 16 with the spreading code of a selected mobile terminal 16 using a rake receiver 15. The output of the rake receiver 15 is the received signal for a particular code channel. Each base station 12 typically includes a plurality of rake receivers 15 so that the base station 12 can receive signals from all three mobile terminals 16 simultaneously using a different rake receiver 15, each of which is matched to a selected code channel. Thus, if mobile terminal 16A is transmitting on code channel A, the output of the rake receiver 15 matched to that code channel, denoted as rake receiver 15A, is the received signal from mobile terminal 16A. Similarly, rake receivers 15B matched to code channel B output a received signal from mobile terminal 16B, and rake receivers 15C matched to code channel C output a received signal from mobile terminal 16O. As will be explained in more detail below, the received signals output from the rake receivers 15A, 15B, and 15C include mutual interference caused by the transmissions from the other mobile terminals 16, as well as intersymbol interference (ISI).

Each mobile terminal 16 transmits its respective signal through different uplink propagation channels. In this context, the term "channel" refers to the propagation path or transmission path between two or more points, and includes multipath propagation channels. The term propagation path or multipath as used herein refers to a single propagation path in a multipath channel. The term channel is also used to refer to a code channel in a CDMA system, or to a particular frequency and timeslot in a TDMA system, that is used for communication between two devices. In most instances, the appropriate meaning should be apparent from the context. However, an effort will be made to use the term "communication channel" or "code channel" when referring to a channel used for communication between two devices, as opposed to a propagation path.

The set of uplink propagation channels between each mobile terminal 16 and each transmit antenna 14 may be represented using the nomenclature $C_{jk}$. This symbol denotes the channel between the jth mobile terminal 16 and the kth transmit antenna 14 Thus, in the illustration, $C_{11}$ denotes the channel between mobile terminal 16A and transmit antenna 14A, $C_{12}$ denotes the channel between mobile terminal 16A and transmit antenna 14B, and so on.

The propagation channel between a given mobile terminal 16 and a given antenna 14 comprises a number of propagation paths. These multiple propagation paths, referred to as multipaths, each have characteristic attenuation, phase, and delay attributes, which may be expressed as a complex coefficient representing magnitude and phase, and a corresponding delay attribute. Thus, channel $C_{jk}$ may be represented by the polynomial $C_0 + C_1 z^{-1} + C_2 z^{-2} + \ldots + C_{n-1} z^{-(n-1)}$ where $C_n$ represents the channel coefficient associated with a single multipath and is a delay operator that represents the unit delay of the various multipaths relative to the first received multipath. The time delay operator could be expressed relative to a multipath other than the first received multipath, in which case the above expression would include channel coefficients with positive delay elements (e.g., $C_x z^{+4}, C_{x-1} z^{+3}$, and so on). In any case, the above expressions demonstrate that the multipath channel between any mobile terminal 16 and a transmit antenna 14 may be expressed as a polynomial in z, based on the channel coefficients and corresponding path delays associated with the multipaths involved. If the multipath delay spread is less than one symbol period, each received symbol in a received signal will depend only on the current symbol and the two adjacent symbols making each z-polynomial of order three.

The multipath channel for the downlink direction (i.e., base station 12 to mobile terminal 16) is generally different than the uplink direction (e.g., mobile terminal 16 to base station 12).

Assuming that the transmitted signals from different mobile terminals 16 are time aligned at the base station 12, the rake receivers 15 should be able to separate signals received from different mobile terminals 16 without any resulting interference between signals from the different mobile terminals 16 (other than as noise). However, the transmitted signals travel over multiple uplink propagation paths to each base station 12. This multipath propagation results in cross correlation between different spreading codes with different time delays even when the different spreading codes are mutually orthogonal. Consequently, a received signal on a given code channel from a given mobile terminal 16 will include some interference from signals transmitted on other code channels by other mobile terminals 16.

The correlations between different spreading codes used by the mobile terminals 16 with varying time delays can be determined and used to model the mutual interference between mobile terminals 16. As used herein, the term "mutual interference" means interference between mobile terminal signals resulting from cross-correlation of spreading codes with varying time delays. The interference correlations between different spreading codes can then be combined with the channel estimates $C_{jk}$ to model the dependence of each signal sample in a received signal associated with a wanted information symbol on the other information symbols in the same received signal, and on the mutual interference added in the received signal due to the transmissions from other mobile terminals 16.

Based on the foregoing, the dependence of the output of all rake receivers 15 at all base stations 12 on the transmitted signals from all of the mobile terminals 16 can be expressed in matrix form as follows:

$$\begin{bmatrix} A_{11} & A_{12} & \cdots & A_{1n} \\ A_{21} & A_{22} & \cdots & A_{2n} \\ \vdots & \vdots & \cdots & \vdots \\ A_{ml} & A_{m2} & \cdots & A_{mn} \end{bmatrix} \quad \text{(Eq. 1)}$$

The matrix shown in Eq. (1) is referred to herein as the interference matrix A. Where there are N mobile terminal 16 and M base stations 12, the size of the matrix will be MN×N. Thus, the suffix m in Eq. 1 is equal to MN. In the example used herein, there are three base stations 12 and three mobile terminals 16, so there are 9 rows in the interference matrix A. Each row of the interference matrix A corresponds to the output of one rake receiver 15. Each column in the interference matrix A corresponds to a particular mobile terminal signal. Since there are three mobile terminals 16, there are three columns in the interference matrix A. Each element of the interference matrix A is a z-polynomial that represents the interference in the output of a particular rake receiver 15 attributable to the symbol sequence transmitted by a particular mobile terminal 16. For example, looking at the first row of the interference matrix A, the first matrix element represents the output of rake receiver 1 attributable to symbols from mobile terminal 16A. The second matrix element represents the interference in the output of rake receiver 1 attributable to mobile terminal 16B and the third matrix element represents the interference in the output of rake receiver 1 attributable to mobile terminal 16C. Since rake receiver 1 is matched to the code channel used by mobile terminal 16A, the first matrix element models the interference of the symbol stream to itself, i.e., intersymbol interference attributable to multipath propagation. The second and third matrix elements model the mutual interference added to the output of rake receiver 1 by mobile terminals 16B and 16C, respectively. Thus, each row of the interference matrix provides a complete model of the output of a single rake receiver 15 in terms of past, present and future symbols of all mobile terminals 16.

The present invention makes use of interference matrix A to suppress mutual interference between different mobile terminal signals. The received signals output from each rake receiver 15 at each base station 12 are input to a central processor 18 as shown in FIG. 1. Additionally, the multipath channel estimates Cjk formed within the rake receivers 15 at each base station 12 are input to the central processor 18. Numerous methods exist for estimating a channel. For example, the mobile terminal signal may contain known pilot codes that can be used by the rake receivers 15 to generate channel estimates. Other methods of estimating the channel could also be used. Since the particular technique for estimating channels is not a material aspect of the present invention and such techniques are well-known in the art, further discussion of channel estimation is omitted.

The central processor 18 performs interference rejection combining by multiplying a vector R of the received signals by $(A^\# A)^{-1} A^\#$ to obtain estimates of the transmitted signals from each mobile terminal 16. This operation is shown in Equation (2) below:

$$T = (A^\# A)^{-1} \cdot A^\# \cdot R, \qquad \text{Eq.(2)}$$

where T is a vector of the estimated transmitted signals, R is a vector of the received signals output from the rake receivers, and $A^\#$ represents the time-reversed conjugate transpose of the interference matrix A. The central processor 18 processes the received signals at symbol rate. Each of the received signals comprises a stream of complex signal samples. The sample streams output from the rake receivers 15, referred to herein as the receiver output signals, are input to the central processor 18. The receiver output signals typically comprise one sample per information symbol. The central processor 18 forms a received signal vector R of samples output from all the rake receivers 15 at the same time instant, and the preceding and following samples. The arrangement of signal samples in R is as follows:

$$R = \begin{bmatrix} r_1(i-1) & r_1(i) & r_1(i+1) \\ r_2(i-1) & r_2(i) & r_2(i+1) \\ r_3(i-1) & r_3(i) & r_3(i+1) \\ \vdots & \vdots & \vdots \\ r_{m(i-1)} & r_m(i) & r_m(i+1) \end{bmatrix} \qquad \text{Eq. (3)}$$

Each row is regarded as the coefficient of a z-polynomial $r_j(z)$, which represents the sequence of samples output from rake receiver j.

The time-reversed conjugate transpose matrix $A^\#$ in Eq. 2 functions as a diversity combining matrix. Multiplication of the received signal vector R by the diversity combining matrix $A^\#$ produces a vector D of diversity combined signals. A simple example of the correct way to form the time-reversed conjugate transpose of a matrix of z-polynomials is given below. Assuming an exemplary matrix, $$\begin{bmatrix} A_{11}^0 + A_{11}^1 z & A_{12}^0 + A_{12}^1 z + A_{12}^2 z^2 \\ A_{21}^0 & A_{22}^0 + A_{22}^3 z^3 \end{bmatrix} \qquad \text{Eq. (4)}$$

it is desired to find the matrix that would have the conjugate frequency response and also be the transpose. The z-polynomial matrix with the conjugate frequency response is given as, $$\begin{bmatrix} A_{11}^{0*} + A_{11}^{1*} z^{-1} & A_{12}^{0*} + A_{12}^{1*} z^{-1} + A_{12}^{2*} z^{-2} \\ A_{21}^{0*} & A_{22}^{0*} + A_{22}^{3*} z^{-3} \end{bmatrix} \qquad \text{Eq. (5)}$$

Now, to eliminate the negative powers of z in order to obtain polynomials in the same variable as the original matrix, it is necessary to multiply the whole matrix by the highest power of z in the entire matrix, in this case $z^3$. This operation results in, $$\begin{bmatrix} A_{11}^{1*} z^2 + A_{11}^{0*} z^3 & A_{12}^{2*} z + A_{12}^{1*} z^2 + A_{12}^{0*} z^3 \\ A_{21}^{0*} z^3 & A_{22}^{3*} + A_{22}^{0*} z^3 \end{bmatrix} \qquad \text{Eq. (6)}$$

where it may be seen that the polynomials have extra powers of z as compared with merely reversing the order of the original coefficients.

Each element of the diversity combined signal vector $D_n$ is a weighted combination of received signals output from each rake receiver 15 that maximizes the signals from a corresponding one of the mobile terminals 16. In the example given herein, diversity signal $D_1$ maximizes the signal transmitted from mobile terminal 16A, diversity signal $D_2$ maximizes the signal from mobile terminal 16B, and diversity signal $D_3$ maximizes the signal from mobile terminal 16C.

The inverse matrix $(A^\# A)^{-1}$ functions as an interference suppression matrix to suppress mutual interference between signals from different mobile terminals 16, and to eliminate intersymbol interference (ISI) between symbols of the same signal resulting from multipath propagation. For purposes of further discussion, the inverse matrix $(A^\# A)^{-1}$ will be referred to as the interference suppression matrix B. Therefore, Equation (2) can be rewritten as follows:

$$T = B \cdot D \qquad \text{(Eq. 7)}$$

where B equals $(A^\# A)^{-1}$ and D equals $A^\# \cdot R$.

In order to compute the interference suppression matrix B from the interference matrix A, the product of the interference matrix A and the time-reversed conjugate transpose matrix $A^\#$ is inverted. Finding the time-reversed conjugate transpose of a matrix is straightforward and has been described above. Thus, the problem at hand concerns how to invert the matrix $(A^\# A)$ of z-polynomials.

Matrix theory describes the procedure for computing the inverse of a matrix as follows. First, transpose the matrix then replace every element by its cofactor to obtain a matrix known as the adjoint matrix. Then divide each element of the adjoint matrix by the determinant of the original matrix to obtain the inverse matrix.

The determinant of a matrix is given by sums of products of its elements and is computable in a deterministic fashion.

For example, assuming the following 3×3 matrix, $$[A] = \begin{bmatrix} A_{11} & A_{12} & A_{13} \\ A_{21} & A_{22} & A_{23} \\ A_{31} & A_{32} & A_{33} \end{bmatrix} \quad \text{Eq. (8)}$$

the determinant may be calculated as:

$$A_{11}(A_{22} \cdot A_{33} - A_{32} \cdot A_{23}) - A_{12}(A_{21} \cdot A_{33} - A_{31} \cdot A_{23}) + A_{13}(A_{21} \cdot A_{32} - A_{31} \cdot A_{22}) \quad \text{Eq.(9)}$$

The cofactor of element $A_{11}$ is $(A_{22} \cdot A_{33} - A_{31} \cdot A_{23})$, which is therefore the first element of the adjoint matrix. The first element of the inverse matrix is thus, $$\frac{(A_{22} \cdot A_{33} - A_{32} \cdot A_{23})}{A_{11}(A_{22} \cdot A_{33} - A_{32} \cdot A_{23}) - A_{12}(A_{21} \cdot A_{33} - A_{31} \cdot A_{23}) + A_{13}(A_{21} \cdot A_{32} - A_{31} \cdot A_{22})} \quad \text{Eq. (10)}$$

When each matrix element $A_{jk}$ in the matrix A is a z-polynomial, it may be deduced that the numerator in Eq. (10) is a z-polynomial of twice the order of the $A_{jk}$, while the denominator is a polynomial of three times the order of $A_{jk}$. Therefore, the inverse matrix comprises elements that have both a numerator z-polynomial and a denominator z-polynomial.

According to Eq. (7), the diversity combined signals $D_n$ in the diversity combined signal vector D must be processed by multiplication with respective elements of the interference suppression matrix B and summed to obtain a vector of the transmitted signals. Multiplication of the diversity combined signals $D_n$ with corresponding elements of the interference suppression matrix B can be divided into two operations. First, the diversity combined signals may be divided by the determinant of matrix $(A^\#A)$, which eliminates ISI. Second, the diversity combined signal vector D can be multiplied by the adjoint matrix $(A^\#A)^{ADJ}$. Multiplication of the diversity combined signal vector D by the adjoint matrix $(A^\#A)^{ADJ}$ eliminates interference between signals from different mobile terminals 16. Because these operations are linear, they can be performed in any order. Thus, Equation (7) can be rewritten as follows:

$$T_k = \left( \frac{1}{\det|A^\# \cdot A|} \right) \cdot |A^\# A|^{ADJ} \cdot D \quad \text{Eq. (11)}$$

If the exact interference matrix A is used to process the received signals $R_n$ to from the transmit signals $T_k$ from each of the mobile terminals 16, multipath interference between the signals from different mobile terminals 16 will cancel. Additionally, ISI caused by multipath propagation is also eliminated.

Processing the diversity combined signals $D_n$ by multiplication with the adjoint matrix $(A^\#A)^{ADJ}$ is not problematic, and only involves delaying the diversity combined signals $D_n$ by multiples of a symbol period, along with proper weighting and adding. A finite impulse response (FIR) filter may be used to implement these steps. The diversity combined signals $D_n$ might conveniently be divided into blocks and a whole block processed at once within digital signal processing memory before being output to decoding circuits.

Dividing the diversity combined signals $D_n$ by a denominator z-polynomial (which in this case is $\det(A^\#A)$) is more problematic however. Division by a denominator z-polynomial may be realized as an Infinite Impulse Response (IIR) filter. The impulse response tails off exponentially as a function of the successive powers of the poles of the z-polynomial, i.e. the roots of the denominator polynomial. Thus, if a root of the denominator polynomial has a magnitude less than 1, the impulse response decays; if the root has a magnitude equal to one, the impulse response rings forever; and if the root has a magnitude greater than one, the impulse response grows. The latter case may be dealt with by processing the diversity combined signal block backwards in time to apply those roots that are greater than unity. Thus, the diversity combined signal block may be passed backwards through an IIR filter comprised of the reciprocal roots of the denominator polynomial, which are less than unity, and therefore give a decaying time-reversed impulse response. The roots that were already less than unity form an IIR filter, which is applied in the forward time direction. It remains to determine what to do about roots that lie close to unity. Due to their slow decay, excessive latency in processing the diversity combined signal block exactly would be entailed. If the diversity combined signal block is not processed accurately, by truncating the IIR response for example, there is a risk of causing excessive interference overlap with adjacent blocks because the exact inverse matrix would not have been applied.

Omitting division by the troublesome denominator polynomial is equivalent to multiplying each diversity combined signal $D_n$ by the omitted denominator polynomial, so the resultant ISI would be equal in length to the omitted polynomial, which in the above 3×3 example was three times the length of the individual matrix elements. According to the present invention, such ISI may be tolerated by following the rake receivers 15 and interference suppression combining by an equalizer for each mobile terminal signal. The equalizer may for example comprise a Viterbi Maximum Likelihood Sequence Estimator(MLSE). The base station 12 may have an equalizer that can decode symbols in the presence of normal amounts of multipath propagation delay, but an equalizer for three times the normal amount may be onerous. Therefore omitting the entire denominator polynomial may produce a net channel whose impulse response length exceeds the equalizer's capability. However, one third of the factors in the denominator polynomial may be omitted and this omission is equivalent to multiplying by a polynomial of ⅓rd the order of the denominator polynomial, thereby creating an artificial multipath channel with the same impulse response length as the original multipath channel.

According to one aspect of this invention therefore, ⅓rd of the denominator factors are omitted. The omitted factors are those corresponding to the roots of magnitude closest to unity, which are the terms that cause the most slowly decaying impulse responses, as well as peaks in the frequency spectrum of transmitted energy. Preferably, the roots having logmagnitude closest to zero may be selected as the roots of magnitude closest to unity.

In practice, the received signals output from each rake receiver 15 are input to a central processor 18 that serves a plurality of base stations 12A, 12B and 12C as shown in FIG. 1. Channel estimates $C_{jk}$ produced by the rake receivers 15 are also input to the central processor 18. Central processor 18 includes a numerical processor 20 to perform the matrix operations on the received signals $R_n$ as described above. Using knowledge of the multipath channels $C_{jk}$ and the correlations between different spreading codes, the numerical processor 20 processes the received signals $R_n$ to generate estimates $\hat{T}_k$ of the transmitted signals $T_k$ which are free from mutual interference. The received signals $R_n$ may be processed by the numerical processor 20 at baseband after despreading and rake-combining, which allows symbol-rate processing rather than chip-rate processing.

Figure 2:
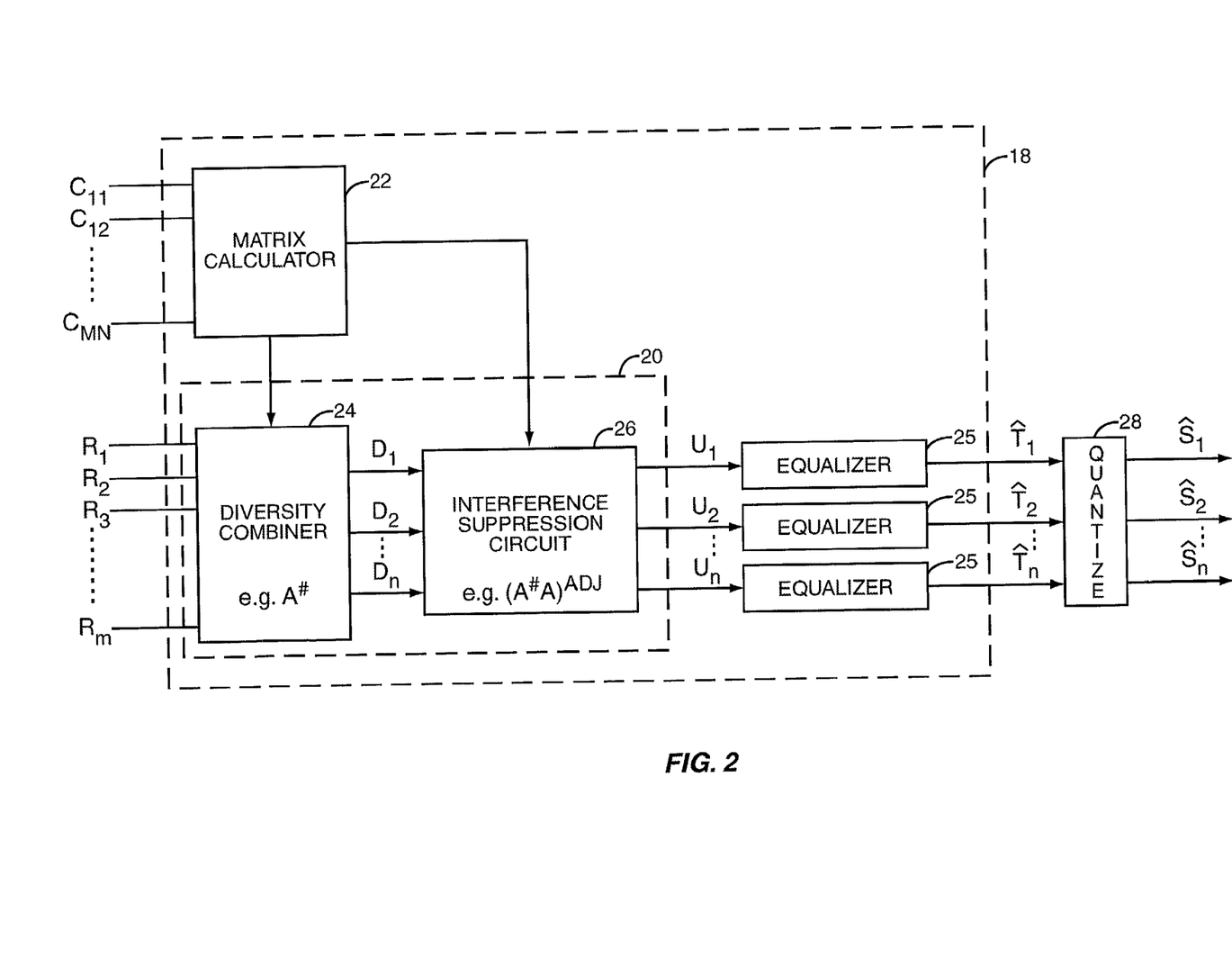
FIG. 2 is a functional block diagram of a central processor in the wireless communication network.

FIG. 2 is a block diagram of the numerical processor 20 illustrating the various functions performed. Numerical processor 20 includes the processing functions of a matrix calculator 22, a diversity combiner 24, an interference suppressor 26, and a plurality of Viterbi equalizers 25. These elements may be implemented as hardware, in software, or a combination of hardware and software. Typically, the numerical processor 18 will be implemented in a single DSP that is specially programmed to perform the above-described matrix operations, but could be implemented by two or more DSPs.

Figure 3:
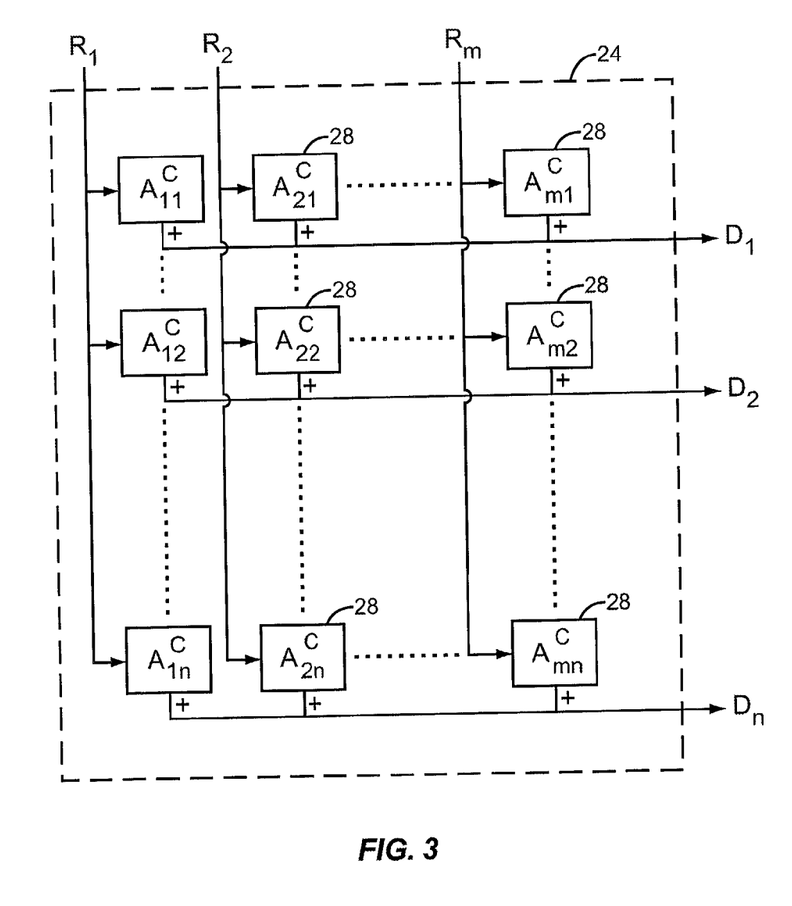
FIG. 3 is a functional block diagram of a diversity combiner in the central processor.

The diversity combiner 24 may be implemented, for example, as a finite impulse response (FIR) filter as shown in FIG. 3. The exemplary diversity combiner 24 shown in FIG. 3 comprises an array of FIR filters 28, each one corresponding to an element of the diversity combining matrix $A^{\#}$. Each receiver output signals $R_m$ is processed by a column of FIR filters 28 and the output of the FIR filters 28 in each row are summed to generate the diversity combined signals $D_n$. The coefficients of the FIR filters 28 are determined by the z-polynomial in the corresponding element in the diversity combining matrix $A^{\#}$.

Figure 4:
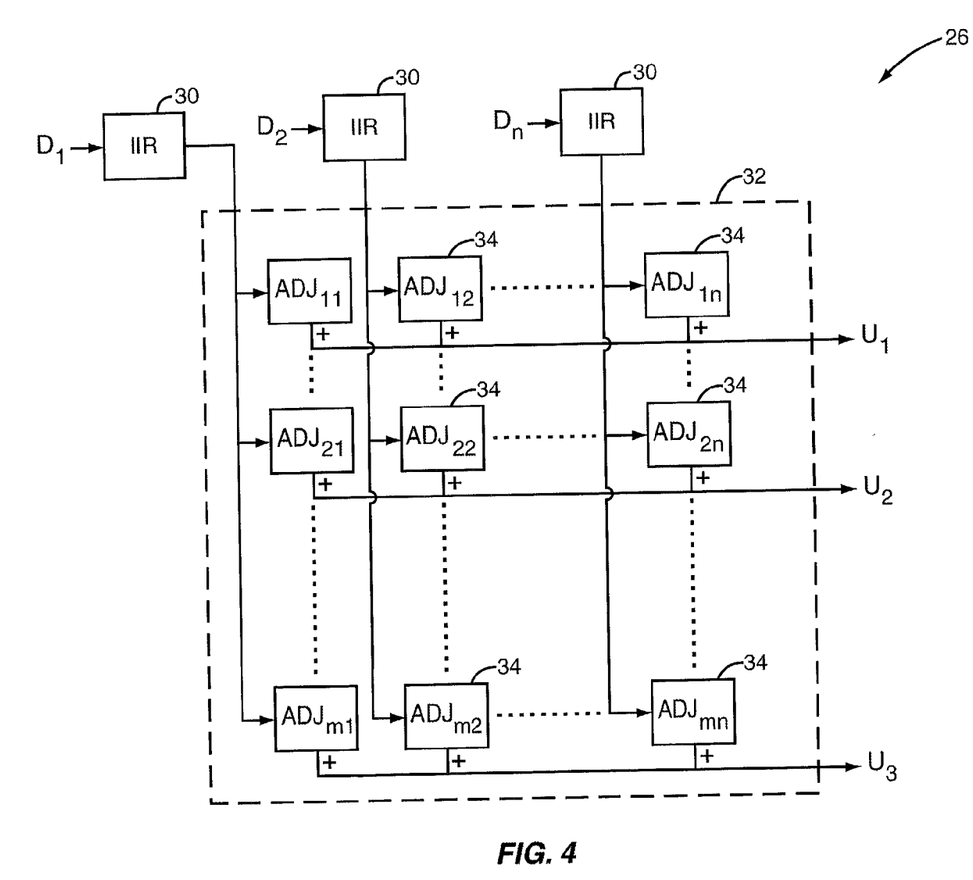
FIG. 4 is a functional block diagram of an interference suppression circuit in the central processor.

FIG. 4 illustrates one exemplary embodiment of the interference suppressor 26. Interference suppressor 26 comprises a bank of Infinite Impulse Response (IIR) filters 30 and a filter array 32 containing a plurality of FIR filters 34. The coefficients of the IIR filters 30 are determined by the determinant z-polynomial of the matrix $(A^{\#}A)$ and, as previously described, may be reduced in order by the omission of the determinant roots closest to unity. The number of roots omitted may be anything from none up to the capability of equalizers 25 to handle ISI. In the disclosed embodiment, the IIR filters 30 precede the filter array 32, However, those skilled in the art will recognize that this order may be reversed and that the IIR filters may follow the filter array 32.

In the exemplary embodiment of the interference suppressor 26 shown in FIG. 4, the diversity combined signals are processed first through the IIR filters 30. The outputs of the IIR filters 30 are then processed through filter array 32. As stated above, this order of processing may be reversed. Each FIR filter 34 in filter array 32 corresponds to one matrix element in the adjoint matrix $(A^{\#}A)^{ADJ}$. The elements of the adjoint matrix $(A^{\#}A)^{ADJ}$ are designated by the nomenclature $ADJ_{jk}$. The index j indicates the row of the corresponding adjoint matrix element, and the index k indicates the column of the corresponding adjoint matrix element. Each diversity signal $D_n$ is processed by a column of FIR filters 34 and the output of the FIR filters 34 in each row are then summed to obtain the estimates $U_k$ of the transmitted signals $T_k$, which are still corrupted by ISI if a reduced determinant polynomial is used in the IIR filters 30.

Matrix calculator 22 receives the channels estimates $C_{jk}$ and calculates the coefficients of the IIR filter, FIR filters 28, and FIR filters 32. More particularly, the matrix calculator 22 receives M×N×L channel coefficients describing the M×N multipath channels $C_{jk}$ from each one of the N mobile terminals 16 to each one of the M antennas 14. Each channel coefficient is a polynomial of length L, which is the impulse response length of the multipath channels $C_{jk}$. The impulse response length L equates to the number of multipaths in each multipath channel $C_{jk}$.

Combining the set of channel coefficients with the correlations between different spreading codes, the matrix calculator 22 forms a MN×N interference matrix A. In the example of three bases stations 12, this matrix has dimensions of 3N×N. The matrix calculator 22 then computes the time-reversed conjugate transpose matrix $A^{\#}$, the adjoint matrix $(A^{\#}A)^{ADJ}$, and a determinant polynomial of the matrix $(A^{\#}A)$. Matrix calculator 22 factors the determinant polynomial to determine the NL-1 roots of the determinant polynomial and deletes the L' roots having smallest absolute value of logmagnitude. In this example, L' is one less than L. The reduced determinant polynomial determines the IIR filter coefficients as previously described, the adjoint matrix $(A^{\#}A)^{ADJ}$ determines the coefficients of the FIR filters 34 in filter array 32, and the transpose conjugate matrix $A^{\#}$ determines the coefficients of the FIR filters 28 in the diversity combiner 24.

The receiver output signals $R_m$ are input to numerical processor 20. Within the numerical processor 20, the receiver output signals $R_m$ are combined by the diversity combiner 24 to obtain the diversity combined signals $D_n$. The diversity combined signals $D_n$ are then processed through IIR filters 30 corresponding to the reduced determinant polynomial and through FIR filters 34 corresponding to the adjoint matrix polynomials as follows.

The diversity combined signals $D_n$ are assembled into sample blocks by the central processor 18 and processed by the IIR filters 30 to compensate for anticipated intersymbol interference (ISI) caused by delayed versions of the same signal. Each sample block is passed in the reverse time direction through those filter elements formed from the reciprocals of roots of the reduced determinant that have a magnitude greater than unity and in the forward time direction through filter elements formed from the reduced determinant roots of magnitude less than unity to obtain IIR-processed sample blocks. Each omitted root requires the central processor 18 to deal with one extra symbol period worth of multipath time dispersion.

The IIR processed sample blocks are then processed by matrix multiplication with corresponding adjoint matrix polynomials to suppress mutual interference between mobile terminals 16. Each sample block is processed by a corresponding column of FIR filters 34 in the FIR filter array 32. The filtered sample blocks from FIR filters 34 in the same row are then summed to obtain estimates $U_k$ of the transmitted signals $T_k$. If the IIR filters 30 use a reduced determinant polynomial, the estimate $U_k$ will still contain some ISI. These estimates $U_k$ are then processed through Viterbi equalizers 25 to equalize the estimates $U_k$ for any remaining ISI and to generate the final estimates $\hat{T}_k$ of the transmitted signals $T_k$. If the determinant polynomial for the IIR filters 30 is not reduced, there would be no need for equalizers 25 since the IIR filters in that case would remove all ISI. A quantizer 28 may follow equalizers 25 to quantize the final estimates $\hat{T}_k$ and to generate a sample stream $\hat{S}_k$ of the closest symbols in the symbol alphabet.

The relative phases of the receiver output signals $R_m$ must be at least as stable as the changes in multipath propagation channel coefficients, which means that their relative frequency accuracy should be better than the Doppler frequency caused by relative motion between the mobile terminals 16 and the receive antennas 14. This ensures that the mechanism used to keep the central processor 18 provided with up-to-date and accurate CSI is also sufficient to compensate for any phase difference or phase drift between sites. When the three receive antennas 14A, 14B, and 14C are on different sites far apart, the polynomial orders may be somewhat higher, owing to the potentially greater relative path delays expressed in symbol periods However, this increase in polynomial orders is small as compared with attempting to perform a similar function at the chip level.

Figure 5:
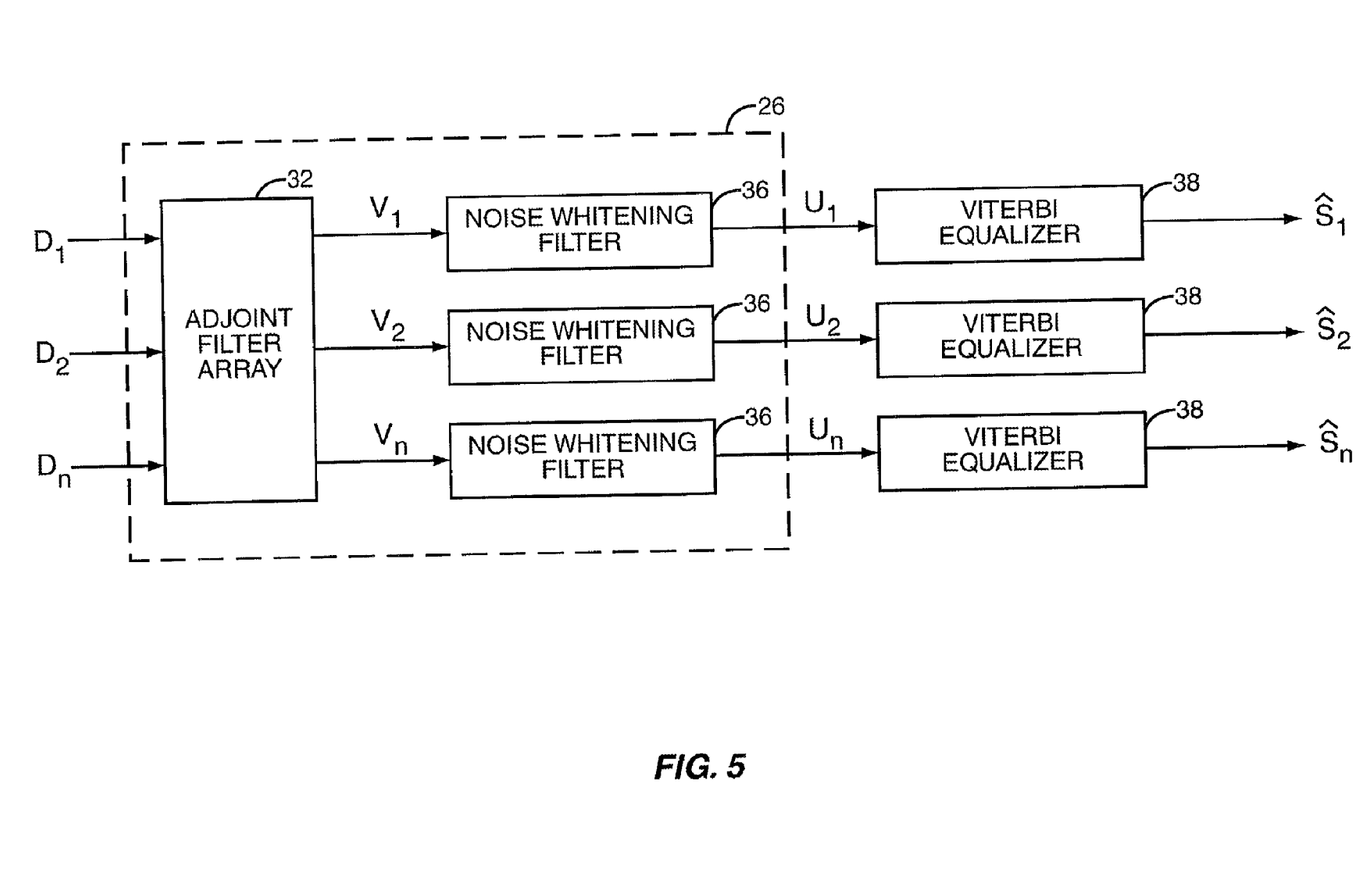
FIG. 5 is a functional block diagram of a second embodiment of an interference suppression circuit in the central processor.

FIG. 5 illustrates an alternate embodiment of the interference suppressor 26. Instead of canceling or removing ISI from the diversity combined signals $D_n$ by dividing the sample streams $R_m$ by the determinant to form a channel inverse equalizer, which may be ill-conditioned, the Viterbi maximum likelihood sequence estimation algorithm can be used to decode symbols subject to ISI. The Viterbi maximum likelihood sequence estimation algorithm hypothesizes symbol sequences and applies the ISI to the symbol sequence to generate an expected sample stream $U_k$. The sum square errors between expected and actual signal samples is then a measure of the correctness of the hypothesis and the Viterbi algorithm determines the sequence that minimizes the sum square errors. Assuming that noise on successive signal samples is uncorrelated, that is "white", this is also the sequence most likely to be correct. If the noise is not uncorrelated but instead "colored", a noise whitening filter can be used ahead of the Viterbi equalizer. In this application, the color of the noise can be determined by assuming that the noise received at each base station 12 is white, but then is modified by combination with the z polynomial matrices which are known. The noise-whitening filter and division by the determinant are thus rolled into a diagonal matrix of IIR filters 36, the purpose of which is to whiten the noise for each sample stream ahead of the associated Viterbi equalizer.

The arrangement described above is demonstrated in FIG. 5. The diversity combined signals $D_n$ from the diversity combiner 24 are input to the filter array 32 to remove mutual interference between different mobile signals. The FIR filter array 32 combines the diversity combined signals $D_n$ to generate estimates $V_k$, which are subject to intersymbol interference. The estimates $V_k$ are input to a noise whitening filter 36 to remove "color" introduced by the matrix operations. The noise whitened estimates $U_k$ are then input to respective Viterbi equalizers 38 that determine the most likely transmitted symbol streams $\hat{S}_k$.

Although FIG. 1 illustrates three base stations 12 producing rake-combined outputs for three terminals, the invention is operable when selected base stations 12 produce rake-combined outputs for different numbers of mobile terminal 16. The resulting interference matrix A would then have no polynomials in the positions where a base station 12 does not produce a rake-combined output for a given mobile terminal 16. A base station 12 may also include a rake receiver 15 that output signals from a mobile terminal 16 that is not within the group of N received signals processed by the central processor 18, but which is sent instead to a different central processor 18 associated with a different group of base stations 12. Each base station 12 may also receive signals from a plurality of mobile terminals 16 using two antenna polarizations. The signals received from the same mobile terminal 16 on different polarizations may be rake-combined. Alternatively, signals received from the same mobile terminals 16 on different polarizations may be treated as two distinct signals to produce 2N received signals. In the latter case, the interference matrix would have a size of 2MN×N polynomials, thus increasing the order of diversity reception from three to six in the Example of FIG. 1. The higher order of diversity reception decreases the likelihood of encountering determinant poles of excessive Q factor and the likelihood of having to delete many determinant roots, allowing reduction in the complexity of the equalizers 38.

What is claimed is:

1. A method of processing received signals, said method comprising:
receiving a combined signal at a receiving station containing mobile terminal transmissions from a plurality of mobile terminals;
despreading said combined signal to obtain a first received signal from a first mobile terminal and a second received signal from a second mobile terminal, wherein said first and second received signals each comprise a plurality of successive signal samples;
determining channel estimates for propagation channels between each of said first and second mobile terminals and said receiving station;
determining interference correlations between first and second spreading codes used respectively by said first and second mobile terminals;
computing filter coefficients of an interference suppression filter/matrix based on said channel estimates and said interference correlation; and
combining said first and second received signal with said interference suppression filter/matrix to reduce interference in said first received signal attributable to said second received signal.

2. The method of claim 1 wherein computing coefficients of an interference suppression filter/matrix based on said channel estimates and said interference correlation comprises:
determining an interference matrix A based on said channel estimates and said interference correlations;
computing said filter coefficients based on said interference matrix.

3. The method of claim 2 wherein computing said filter coefficients based on said interference matrix comprises computing the adjoint of the matrix $(A^\# A)$ where $A^\#$ means "time-reversed conjugate transpose of A."

4. The method of claim 3 wherein computing said filter coefficients based on said interference matrix comprises computing the inverse of the matrix $(A^\# A)$ where $A^\#$ means "time-reversed conjugate transpose of A.".

5. The method of claim 4 wherein computing the inverse of the matrix $(A^\# A)$ comprises:
computing the adjoint of the matrix $(A^\# A)$ to define a set of FIR filters; and
computing the determinant of the matrix $(A^\# A)$ to determine an IIR filter.

6. The method of claim 5 wherein computing said filter coefficients based on said interference matrix further comprises deleting selected roots of said determinant and thereby deleting corresponding factors in said IIR filter.

7. The method of claim 6 further comprising canceling intersymbol interference in said first received signal by processing said first received signal through an equalizer.

8. The method of claim 7 wherein processing said first received signal through an equalizer comprises processing said first received signal with a Maximum Likelihood Sequence Estimator.

9. The method of claim 7 further comprising filtering said first received signal through a noise whitening filter ahead of said equalizer.

10. The method of claim 1 further comprising processing said first received signal in an equalizer to compensate for intersymbol interference between symbols of said first received signal.

11. The method of claim 10 wherein processing said first received signal in an equalizer to compensate for intersymbol interference between symbols of said first received signal comprises processing said first received signal with a Maximum Likelihood Sequence Estimator.

12. The method of claim 10 further comprising filtering said first received signal with a noise whitening filter ahead of said equalizer.

13. The method of claim 1 wherein determining channel estimates for propagation channels between each of said first and second mobile terminals and said receiving station comprises determining channel estimates for at least two propagation paths for each propagation channel.

14. A method of processing received signals from a plurality of mobile terminals in a diversity receiving system, said method comprising:
    receiving combined signals at a plurality of receiving stations, each said combined signal containing transmissions from a plurality of mobile terminals;
    despreading said combined signals at each receiving station to obtain a plurality of received signal sample streams, each received signal sample stream depending primarily on a sequence of symbols transmitted from a corresponding mobile terminal;
    inputting said received signal sample streams to a central processor; and
    combining said received signal sample streams at said central processor so as to cancel interference in each sample stream due to symbols transmitted from mobile terminals other than that on which the sample stream primarily depends, wherein combining said received signals comprises:
        determining channel estimates corresponding to the propagation channels from each of said mobile terminals to one or more of said receiving stations;
        determining the interference correlations between spreading codes used by each interfering pair of mobile terminals;
        forming an interference matrix A based on said channel estimates and said interference correlations; and
        combining said received signal sample streams using said interference matrix A.

15. The method of claim 14 wherein combining said received signal sample streams using said interference matrix A comprises:
    combining said received signal sample streams from said plurality of mobile terminals in a diversity combiner to obtain a plurality of diversity combined signals, such that each diversity combined signal maximizes said received signals corresponding to a selected one of said mobile terminals; and
    combining said diversity combined signals in an interference cancellation processor to cancel interference in said diversity combined signals due to symbols transmitted by mobile terminals other than the selected mobile terminal to which each diversity combined signal corresponds.

16. The method of claim 15 wherein combining said received signals from said plurality of mobile terminals in a diversity combiner to obtain a plurality of diversity combined signals comprises:
    forming a diversity combining matrix based on said interference matrix;
    multiplying a received signal vector by said diversity combining matrix; said received signal vector comprising a group of neighboring received signal samples from each of said received signal sample streams.

17. The method of claim 16 wherein forming a diversity combining matrix based on said interference matrix comprises computing the time-reversed conjugate transpose $A^{\#}$ of the interference matrix A.

18. The method of claim 15 wherein combining said diversity combined signals in an interference cancellation processor to cancel interference in said diversity combined signals comprises:
    computing an interference suppression matrix based on said interference matrix A; and
    further combining said diversity combined signals using said interference suppression matrix.

19. The method of claim 18 wherein computing an interference suppression matrix based on said interference matrix A comprises computing the adjoint of the product matrix $(A^{\#}A)$, where $A^{\#}$ is the time-reversed conjugate transpose of A.

20. The method of claim 18 wherein computing an interference suppression matrix based on said interference matrix A comprises computing the inverse of the matrix product $(A^{\#}A)$ where $A^{\#}$ is the time-reversed conjugate transpose of A.

21. The method of claim 20 wherein computing the inverse of the matrix $(A^{\#}A)$ comprises:
    computing the adjoint of the matrix $(A^{\#}A)$ to define a matrix of FIR filters;
    computing the determinant of the matrix $(A^{\#}A)$ to form an IIR filter; and
    said further combining comprises filtering using said FIR filters and said IIR filter.

22. The method of claim 21 wherein computing an interference suppression matrix based on said interference matrix A further comprises deleting selected roots of the determinant of matrix $(A^{\#}A)$ and thereby corresponding factors of said IIR filter.

23. The method of claim 22 further comprising canceling intersymbol interference in said received signals by processing said received signals through an equalizer.

24. The method of claim 23 wherein processing said received signals through an equalizer comprises processing said received signals with a Maximum Likelihood Sequence Estimator.

25. The method of claim 24 further comprising filtering said received signal through one or more noise whitening filters ahead of said equalizers.

26. The method of claim 14 wherein combining said received signals from said plurality of receiving stations at said central processor so as to cancel interference between received signals from other mobile terminals comprises:
    combining said received signals from said plurality of mobile terminals in a diversity combiner to obtain a plurality of diversity combined signals, such that each diversity combined signal maximizes said received signals corresponding to a selected one of said mobile terminals; and
    combining said diversity combined signals in an interference cancellation processor to cancel mutual interference between signals received from different mobile terminals to obtain signals containing only intersymbol interference.

27. The method of claim 26 further comprising canceling said intersymbol interference by processing each obtained signal through an equalizer.

28. The method of claim 27 wherein processing said obtained signals through an equalizer comprises processing said obtained signals with a Maximum Likelihood Sequence Estimator.

29. The method of claim 28 further comprising filtering said obtained signals through noise whitening filters ahead of said equalizers.

30. A system for processing signals received from a plurality of mobile terminals, said apparatus comprising:
   a plurality of rake receivers to despread said received signals at least one base station to obtain a plurality of rake-combined signals, wherein each rake receiver uses a spreading code assigned to a corresponding one of said mobile terminals to obtain a received signal from said corresponding mobile terminal;
   one or more channel estimators for generating channel estimates for propagation channels between each one of said mobile terminals and one or more of said base stations; and
   a filter array comprising a first set of interference suppression filters for further combining said rake-combined signals to cancel mutual interference between different mobile terminals to obtain reduced interference signals, and a processor to compute filter coefficients for said first set of interference suppression filters based on said channel estimates and interference correlations between spreading codes for interfering pairs of said mobile terminals.

31. The system of claim 30 wherein said processor computes an interference matrix A based on said channel estimates and interference correlations between interfering pairs of said mobile terminals, and wherein said processor computes said filter coefficients for said first set of interference suppression filters based on said interference matrix.

32. The system of claim 31 wherein said processor computes said filter coefficients for said first set of interference suppression filters by computing the ad joint of the matrix $(A^\# A)$, where $A^\#$ is the time-reversed conjugate transpose of A, each element of the adjoint providing the coefficients for one interference suppression filter in said first set of interference suppression filters.

33. The system of claim 31 further comprising a second set of interference suppression filters to compensate for intersymbol interference between symbols transmitted by the same mobile terminals.

34. The system of claim 33 wherein said processor computes said filter coefficients for said second set of interference suppression filters by computing the determinant of the matrix $(A^\# A)$ where $A^\#$ is the time-reversed conjugate transpose of A.

35. The system of claim 34 wherein said processor further computes said filter coefficients for said second set of interference suppression filters by determining the roots of said determinant and deleting selected roots for each interference suppression filter in said second set of interference suppression filters to obtain shortened interference suppression filters.

36. The system of claim 35 further comprising one or more equalizers to process the outputs of said shortened filters to compensate for intersymbol interference between symbols from the same mobile terminals.

37. The system of claim 36 further comprising one or more noise whitening filters disposed between said first set of interference suppression filters and said equalizers to whiten noise in said received signals.

38. The system of claim 30 further comprising one or more equalizers to process said mutual interference-free signals to compensate for intersymbol interference between symbols transmitted by the same mobile terminals.

39. The system of claim 38 in which said equalizers are Maximum Likelihood Sequence Estimation.

40. The system of claim 39 further comprising one or more noise whitening filters disposed between said first set of interference suppression filters and said equalizers to whiten noise in said received signals.

* * * * *